Figure 1:
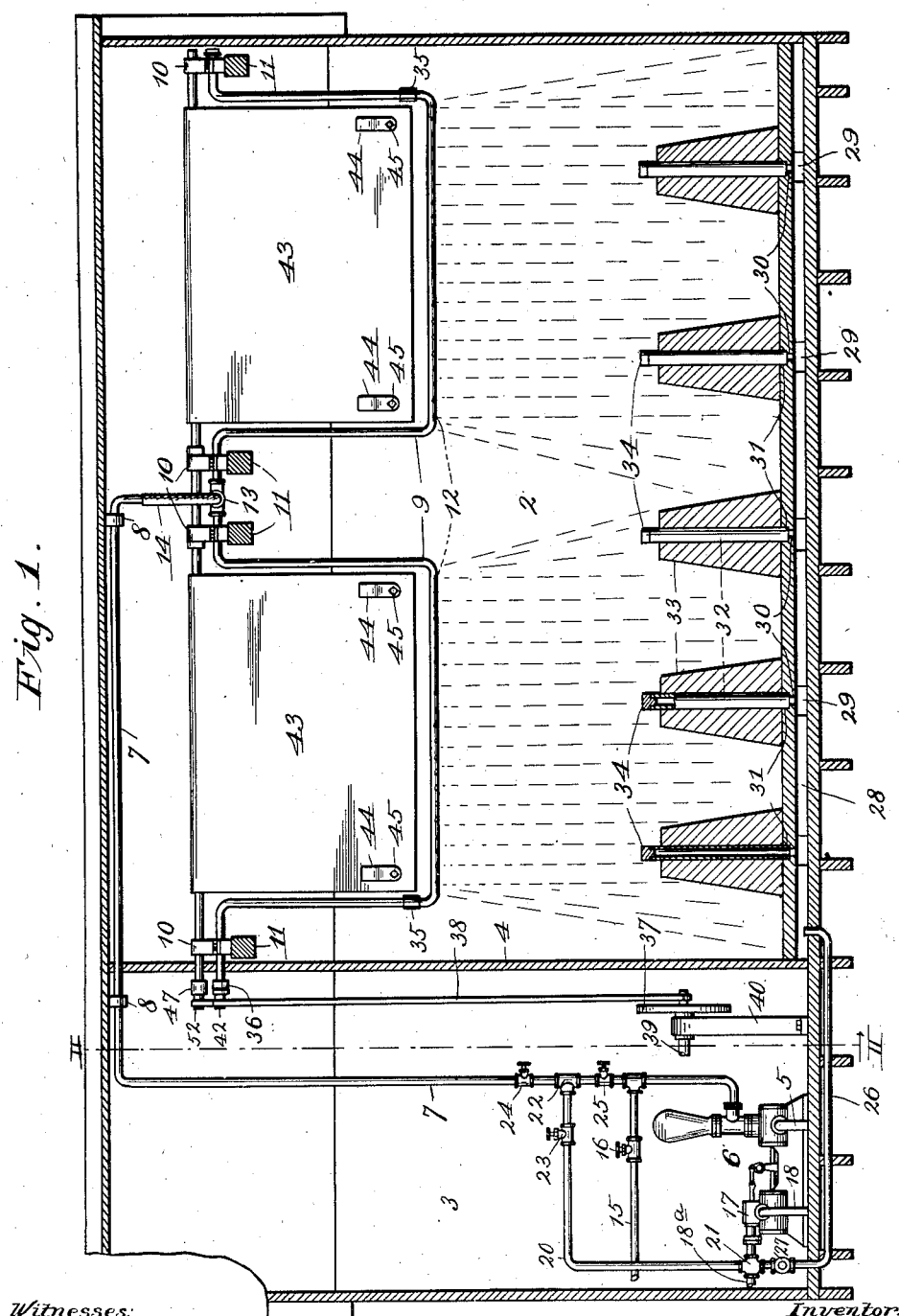

No. 857,841. PATENTED JUNE 25, 1907.
D. D. & P. J. SPRAGUE.
APPARATUS FOR PRODUCING ICE.
APPLICATION FILED JUNE 16, 1906.
2 SHEETS—SHEET 1.

Witnesses:

Inventors
Dudley D. Sprague
and Pearley J. Sprague
By P. G. Fischer, atty.

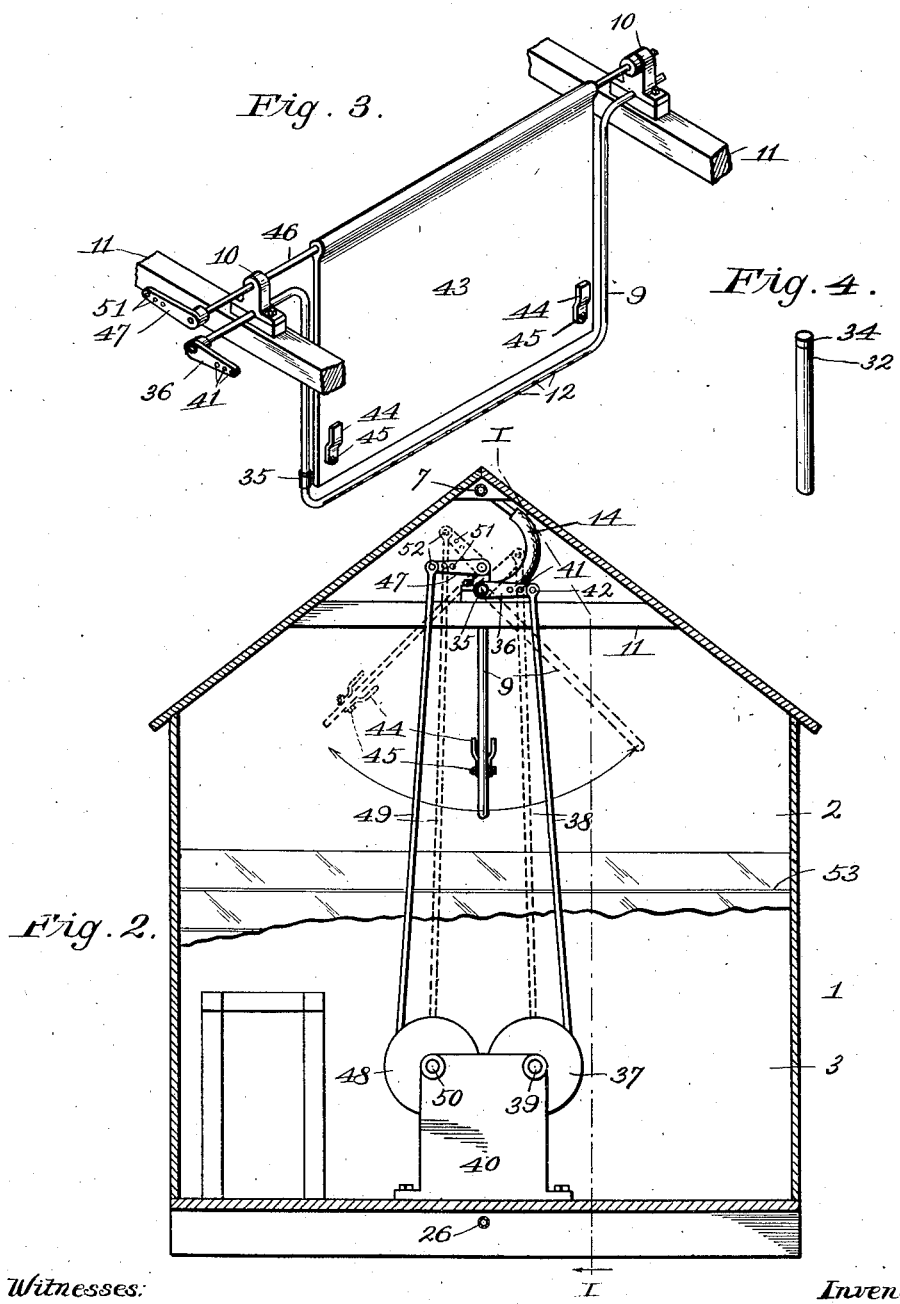

UNITED STATES PATENT OFFICE.

DUDLEY D. SPRAGUE, OF CALIFORNIA, AND PEARLEY J. SPRAGUE, OF GASHLAND, MISSOURI; SAID DUDLEY D. SPRAGUE ASSIGNOR TO SPRAGUE ICE COMPANY, OF CALIFORNIA, MISSOURI.

APPARATUS FOR PRODUCING ICE.

No. 857,841.  Specification of Letters Patent.  Patented June 25, 1907.

Application filed June 16, 1906. Serial No. 322,038.

*To all whom it may concern:*

Be it known that we, DUDLEY D. SPRAGUE and PEARLEY J. SPRAGUE, citizens of the United States, residing at California and Gashland, in the counties of Moniteau and Clay and State of Missouri, have invented certain new and useful Improvements in Apparatus for Producing Ice, of which the following is a specification.

Our invention relates to an improved method of producing ice, and is based upon the well known fact that water separated into spray will congeal more rapidly than when permitted to remain in a large body.

The apparatus is intended for use in the winter season to avoid the necessity of employing expensive machinery and refrigerating agents for congealing the water, and it consists in means for conducting the water to an inclosure, means for discharging it in the form of spray so that each molecule will be exposed to the freezing action of the atmosphere, and means for creating and forcing air-currents through the spray to hasten the congealing process.

The invention consists in the novel construction, combination and arrangement of parts hereinafter described, pointed out in the claims, and illustrated in the accompanying drawings, and in order that it may be fully understood, reference will now be made to said drawings, in which:—

Figure 1 represents an irregular longitudinal sectional view of the invention taken on line I—I of Fig. 2. Fig. 2 is a broken cross-section of the same, taken on line II—II of Fig. 1. Fig. 3 is a detail perspective view of a sprinkler and a fan forming part of the invention. Fig. 4 is a perspective view of one of a plurality of steam-pipes employed in carrying out the invention.

1 designates a building divided into a congealing apartment 2 and a pumping-room 3 by means of a partition 4.

5 designates a water-supply pipe leading to the suction side of a force-pump 6 located in room 3.

7 designates a pipe leading from the discharge side of the pump to the roof of the building and thence into the congealing apartment 2, said pipe being supported by hangers 8.

9 designates a pair of vibratory sprinklers of U-form pivotally mounted in bearings 10, secured to cross-beams 11, and having perforations 12 at their lower portions through which the water is discharged in the form of spray. The adjacent upper portions of the sprinklers are united by a T 13 connected to the discharge end of pipe 7 by a hose or other flexible member 14, so that said T may rock with the sprinklers.

15 designates an overflow pipe communicating with pipe 7 and provided with a valve 16 for controlling the quantity and pressure of the water flowing to the sprinklers. In very cold weather when the maximum volume of water is desired valve 16 is closed so that the entire supply from the pump may flow through pipe 7 to the sprinklers, but in mild weather when more time is consumed in freezing the water it is preferable to reduce the volume; consequently valve 16 is opened to permit part of the water to escape from pipe 7 through the overflow pipe. In thus regulating the flow of water to the sprinklers the pump may be run at constant speed, hence necessity for varying the pressure of the steam is obviated.

Steam is conducted to steam-chest 17 of the pump through a supply-pipe 18, and discharges therefrom through an exhaust-pipe 18ª communicating with a pipe 20 through a cross-coupling 21. Pipe 20 communicates with pipe 7 through a T 22 and is provided with a valve 23 for controlling the flow of steam therethrough. Pipe 7 is provided with valves 24 25 arranged at opposite sides of T 22, the former being provided for the purpose of regulating the pressure of the steam as it enters pipe 7, while the latter is closed to prevent steam from flowing downwardly in said pipe and entering the overflow-pipe 15, or the suction side of the pump.

26 designates a steam-pipe provided with a valve 27 and leading from coupling 21 to a steam duct 28 communicating with lateral ducts 29 spaced equal distances apart. All of said ducts are arranged in the floor of apartment 2 and have eduction ports 30 communicating with sockets 31 arranged in the upper portion of the floor for the reception of steam-pipes 32 closed at their upper ends with plugs 34 to prevent spray from entering therein or steam from escaping therefrom.

The outer upward bends of sprinklers 9 are closed by plugs 35 to exclude the water therefrom, and one of the terminals of the sprinkler at the left side extends into room 3 and is provided with a crank-arm 36 fixed thereto and connected to the wrist-pin of a disk 37 by means of a connecting-rod 38. Disk 37 is fixed upon a shaft 39 journaled in n standard 40 and driven by a suitable motor, not shown. Crank-arm 36 is provided with a series of holes 41 for the reception of a pin 42 adjustably securing the connecting-rod to said crank-arm so that the sweep of the sprinklers may be varied in length.

43 designates a pair of fans extending downwardly between the U-shaped portions of the sprinklers and provided with clips 44 pivoted thereto so that they may be swung outwardly into engagement with the sprinklers when it is desired to have the fans vibrate therewith. The pivoted ends of said clips are held in frictional contact with the fans by bolts 45 so they will remain in any position placed.

Fans 43 are fixed at their upper ends to a shaft 46 mounted in bearings 10 and having one end extending into room 3 and provided with a crank-arm 47 fixed thereto. When it is desired to operate the fans independently of the sprinklers crank-arm 47 is connected to the wrist-pin of a disk 48 by a connecting-rod 49. Disk 48 is fixed upon a shaft 50 journaled in standard 40 and driven by the motor.

Crank-arm 47, like arm 36, is provided with a series of holes 51 for the reception of a pin 52, so that the sweep of the fans may be lengthened or shortened.

If any ice should form in the sprinklers 9, it may be thawed out by opening valve 16, closing valve 25, and opening valve 23, so that steam may flow to the sprinklers through pipes 20 and 7.

In practice, pipes 32 are set upright in sockets 31, so that a portion of the spray will freeze thereon in the form of columns 33, and thus in the aggregate afford a large frozen area for the spray to impinge against as it falls from the sprinklers. This frozen area hastens the process of congealing the spray, and, if desired, it may be increased by placing ice-cones, previously frozen in suitable cans, among the pipes. As the sprinklers vibrate they will distribute the spray uniformly upon the floor, the columns, and the cones, while the currents of air created by the vibrating fans will intermingle with and chill the descending spray so that it will congeal almost immediately upon striking said objects. Ice is permitted to form until it reaches the upper ends of the pipes 32 when the supply of water to the sprinklers is cut off preparatory to removing said pipes. Valve 27 is then opened so that steam may flow into ducts 28 29 and enter the pipes, which are heated until the surrounding ice is sufficiently melted to permit their withdrawal therefrom. The freezing process continues until the ice has reached the desired level when further operations are suspended.

If desired strips 53 may be laid upon the ice at regular intervals to divide it into layers so that it may be readily cut into blocks preparatory to removing it from the building.

From the above description it is apparent that we have produced a method for economically manufacturing commercial ice, and while we have shown and described the preferred apparatus for carrying out our method, we, of course, reserve the right to make such changes as properly fall within the spirit and scope of the appended claims.

Having thus described our invention what we claim and desire to secure by Letters-Patent, is:—

1. In an apparatus for producing ice, the combination of a sprinkler, a pipe for conducting water or steam thereto a valve for controlling the flow of water or steam through said pipe, a force-pump to which said pipe is connected, an overflow-pipe communicating with the first-mentioned pipe, and a valve for controlling the flow of water through said overflow-pipe.

2. In an apparatus for producing ice, the combination with an inclosure, of a sprinkler for discharging water therein, ducts arranged at the bottom of the inclosure, means for conducting a heating agent to said ducts, and steam-pipes adapted to be placed in communication with the ducts, for the purpose described.

3. In an apparatus for producing ice, a vibratory sprinkler, a fan arranged adjacent thereto, means for connecting said fan to the sprinkler so that it will vibrate therewith, and means for vibrating said fan independently of the sprinkler.

4. In an apparatus for producing ice, the combination of sprinklers 9, a force pump 6, a conducting pipe connecting the sprinklers with the force pump, a by-pass pipe 20, communicating with the conducting pipe, an overflow pipe 15 also communicating with the conducting pipe, a valve 25, a valve 16, and steam valves 23 and 24, arranged and operated as shown and described.

5. In an apparatus for producing ice, in combination, a vibratory sprinkler, a pipe for conducting water thereto, means for forcing water through said pipe, means for regulating the flow of water through said pipe, a fan, and clips for connecting said fan to the sprinkler.

6. In an apparatus for producing ice, a vibratory sprinkler, a fan arranged adjacent thereto, means for connecting said fan to the sprinkler so that it will vibrate therewith, and means for varying the sweep of the sprinkler.

7. In an apparatus for producing ice, a vibratory sprinkler, a fan arranged adjacent thereto, means which connect said fan to the sprinkler so that it will vibrate therewith, and columns arranged beneath the sprinkler to receive a portion of the spray discharged therefrom.

In testimony whereof I affix my signature in the presence of two witnesses.

DUDLEY D. SPRAGUE.

Witnesses:
  WM. C. HECK,
  D. W. SARTAIN.

In testimony whereof I affix my signature in the presence of two witnesses.

PEARLEY J. SPRAGUE.

Witnesses:
  OREN J. MOORE,
  WAYNE E. ESTER.